July 23, 1968   R. BRIDGE   3,393,518
AIRCRAFT POWER PLANT
Filed April 3, 1967   2 Sheets-Sheet 1

July 23, 1968 R. BRIDGE 3,393,518
AIRCRAFT POWER PLANT
Filed April 3, 1967 2 Sheets-Sheet 2

United States Patent Office 3,393,518
Patented July 23, 1968

3,393,518
AIRCRAFT POWER PLANT
Robert Bridge, Derby, England, assignor to Rolls-Royce Limited, Derby, England, a British company
Filed Apr. 3, 1967, Ser. No. 627,913
Claims priority, application Great Britain, Apr. 5, 1966, 15,176/66
10 Claims. (Cl. 60—271)

ABSTRACT OF THE DISCLOSURE

In order to reduce the noise of an aircraft power plant employing a fan, the stream of turbine exhaust gases is discharged from the engine beneath at least the greater part of the stream of air which has passed through the fan, so that the noise in the stream of air tends to be refracted and/or reflected upwardly by the turbine exhaust gases.

---

This invention concerns aircraft jet power plant.

According to the present invention, there is provided aircraft jet power plant having ducting through which propulsive gases are directed to atmosphere in the form of substantially a single stream, and means ensuring that the temperature of at least the greater part of the stream decreases substantially in an upward direction to cause noise in the stream to be directed upwardly.

The said ducting may comprise the exhaust duct of a gas turbine engine, means being provided for discharging the greater part of the turbine exhaust gases through the lower half of the exhaust duct.

The exhaust duct may have a final nozzle which is provided a plurality of nozzle members through which the turbine exhaust gases are discharged, the greater part of the total area of the nozzle members open to turbine ehxaust gas flow being disposed in the lower half of the final nozzle. Thus the nozzle members may be substantially elliptical and may be arranged with their major axes vertically above one another, the areas of successive nozzle members decreasing in an upward direction. Alternatively, all the nozzle members may be similarly shaped and have a width which is small in relation to that of the final nozzle, the majority of the nozzle members being disposed in the lower half of the final nozzle.

The ducting may comprise an outer duct within which is mounted a gas turbine engine which drives a fan mounted in the outer duct, the turbine exhaust gases being discharged from the final nozzle of the engine beneath at least the greater part of the air which has passed through the fan, and the turbine exhaust gases and said air together forming the said substantially single stream.

Aircraft power plants employing fans are frequently noisy. By reason, however, of the upward refraction and/or reflection of the noise by the turbine exhaust gases, there will be a substantial reduction in the noise level so far as a person on the ground below the flight path of the aircraft is concerned.

The fan may be a front fan which is driven from the turbine of the gas turbine engine.

The outer duct may have an outlet end which is disposed wholly above the final nozzle of the gas turbine engine.

Thus the said outlet end may be disposed immediately upstream of the final nozzle of the gas turbine engine.

Alternatively the final nozzle of the gas turbine engine may be disposed adjacent the lower part of the outer duct, the said final nozzle being disposed within and upstream of the downstream end of the outer duct, whereby the temperature decreases from the lower to the upper part of the outer duct to cause fan noise in the upper part of the outer duct to be upwardly refracted.

Figure 1:
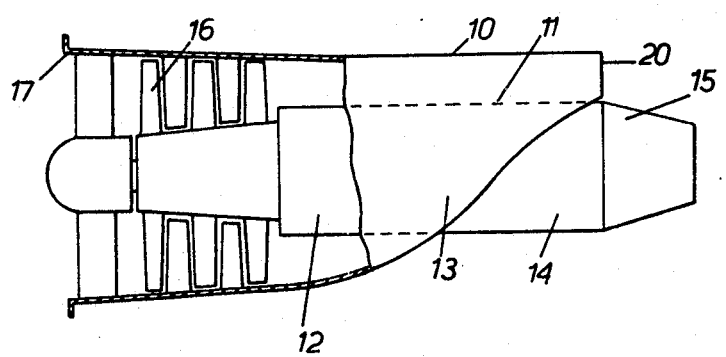
Figure 2:
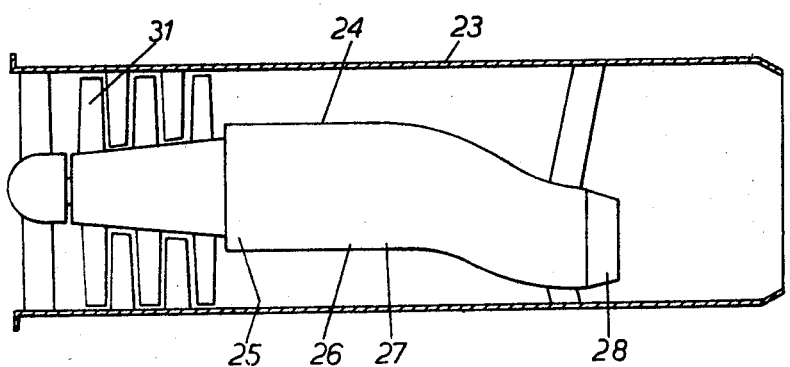
Figure 3:
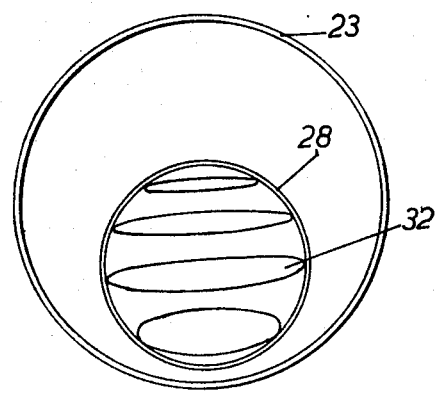
Figure 4:
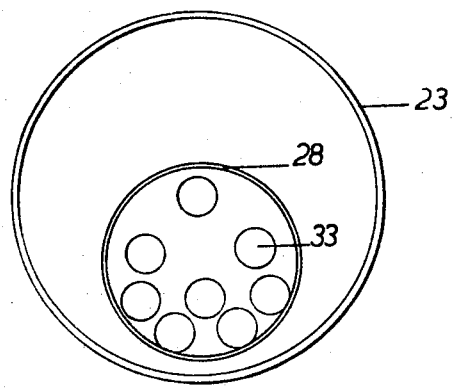

The invention is illustrated, merely by way of example, in the accompanying drawings, in which:

FIGURE 1 is a diagrammatic side view, partly in section, of an aircraft jet power plant according to the present invention, FIGURE 2 is a diagrammatic section through an alternative aircraft jet power plant in accordance with the present invention, and FIGURES 3 and 4 are end views of still further aircraft jet power plants in accordance with the present invention.

Referring first to the embodiment of the invention shown in FIGURE 1, an aircraft jet power plant comprises an outer duct 10 within which there is mounted a gas turbine engine 11 having an inner duct within which there are arranged a compressor 12, combustion equipment 13, turbine 14 and final nozzle 15, all in flow series.

A part of the turbine 14 drives a front fan 16 which is mounted concentrically within the outer duct 10 and is disposed adjacent to the upstream, or inlet, end 17 thereof which is open to a supply of ambient air.

The outer duct 10 has an outlet end 20 which is disposed wholly above and immediately upstream of the final nozzle 15 of the gas turbine engine 11.

As a result of the construction described above, the stream of turbine exhaust gases are discharged from the engine 11 at least the greater part of the stream of air which has passed through the fan 16, the said streams being immediately adjacent to each other to form, in effect, substantially a single stream. The noise from the fan 16 in the said single stream therefore tends to be reflected upwardly by the turbine exhaust gases and is therefore attenuated so far as anybody disposed vertically below the engine 11 is concerned.

The aircraft jet power plant shown in FIGURE 2 comprises a cylindrical outer duct 23 within which is mounted a gas turbine engine 24 having a compressor 25, combustion equipment 26, turbine 27 and an exhaust duct provided with a final nozzle 28, all in flow series. The major portion of the engine 24 is disposed concentrically of the outer duct 23, but the final nozzle 28 is disposed concentrically of the outer duct 23, but the final nozzle 28 is disposed adjacent the lower part of the outer duct 23, the final nozzle 28 being disposed within and upstream of the downstream end of the outer duct 23.

A front fan 31 is mounted within the outer duct 23 and concentrically thereof, and is driven from the turbine 27. The turbine exhaust gases are thus directed from the engine 24 into the lower part of the outer duct 23, while the greater part of the stream of air which has passed through the fan 31 is disposed above the stream of turbine exhaust gases. Thus there is a temperature gradient at the downstream end of the outer duct 23, the temperature decreasing from the lower to the upper part thereof. Accordingly, the fan noise in the single stream leaving the outer duct 23 is upwardly refracted and is therefore attenuated so far as a person vertically below the engine is concerned.

The aircraft jet power plant of FIGURE 2 may be modified as shown in FIGURE 3 by arranging that the final nozzle 28 is provided with a plurality of nozzle members 32 through which the turbine exhaust gases are discharged. The nozzle members 32 are substantially elliptical and are arranged with their major axes vertically above one another, the areas of successive nozzle members 32 decreasing in an upward direction. Thus the greater part of the total area of the nozzle members 32 open to turbine exhaust gas flow are disposed in the lower half of the final nozzle 28. This will tend to effect upward refraction of the noise in the turbine exhaust gases.

In FIGURE 4 there is shown a construction which is generally similar to that of FIGURE 3 except that the elliptical nozzle members 32 are replaced by cylindrical nozzle members 33 all of which have the same diameter, the said diameter being small in relation to that of the final nozzle 28. As will be seen, nearly all the nozzle members 33 are disposed in the lower half of the final nozzle 28.

The power plants shown in the drawings will thus reduce noise at both take-off and landing.

I claim:

1. Aircraft jet power plant having ducting through which propulsive gases are directed to atmosphere in the form of substantially a single stream, and means ensuring that the temperature of at least the greater part of the stream decreases substantially in an upward direction to cause noise in the stream to be directed upwardly.

2. Power plant is claimed in claim 1 in which the said ducting comprises the exhaust duct of a gas turbine engine, means being provided for discharging the greater part of the turbine exhaust gases through the lower half of the exhaust duct.

3. Power plant as claimed in claim 2 in which the exhaust duct has a final nozzle which is provided with a plurality of nozzle members through which the turbine exhaust gases are discharged, the greater part of the total area of the nozzle members open to turbine exhaust gas flow being disposed in the lower half of the final nozzle.

4. Power plant as claimed in claim 3 in which the nozzle members are substantially elliptical and are arranged with their major axes vertically above one another, the areas of successive nozzle members decreasing in an upward direction.

5. Power plant as claimed in claim 3 in which all the nozzle members are similarly shaped and have a width which is small in relation to that of the final nozzle, the majority of the nozzle members being disposed in the lower half of the final nozzle.

6. Power plant as claimed in claim 1 in which the ducting comprises an outer duct within which is mounted a gas turbine engine which drives a fan mounted in the outer duct, the turbine exhaust gases being discharged from the final nozzle of the engine beneath at least the greater part of the air which has passed through the fan, and the turbine exhaust gases and said air together forming the said substantially single stream.

7. Power plant as claimed in claim 6 in which the fan is a front fan which is driven from the turbine of the gas turbine engine.

8. Power plant as claimed in claim 6 in which the outer duct has an outlet end which is disposed wholly above the final nozzle of the gas turbine engine.

9. Power plant as claimed in claim 8 in which the said outlet end is disposed immediately upstream of the final nozzle of the gas turbine engine.

10. Power plant as claimed in claim 6 in which the final nozzle of the gas turbine engine is disposed adjacent the lower part of the outer duct, the said final nozzle being disposed within and upstream of the downstream end of the outer duct, whereby the temperature decreases from the lower to the upper part of the outer duct to cause fan noise in the upper part of the outer duct to be upwardly refracted.

References Cited

UNITED STATES PATENTS

| | | | |
|---|---|---|---|
| 2,664,700 | 1/1954 | Benoit | 181—33.221 |
| 3,027,710 | 4/1962 | Maynter | 181—33.221 |
| 3,033,494 | 5/1962 | Tyler | 181—33.221 |
| 3,174,282 | 3/1965 | Harrison | 181—33.221 |
| 3,289,409 | 12/1966 | Schirmer | 60—264 |

FOREIGN PATENTS 916,607    8/1954    Germany.

MARTIN P. SCHWADRON, *Primary Examiner.*

DOUGLAS HART, *Assistant Examiner.*